United States Patent Office 2,793,210
Patented May 21, 1957

2,793,210

17-AMINOYOHIMBANE AND SUBSTITUTION PRODUCTS THEREOF

Walter Voegtli, Evanston, Ill., assignor to G. D. Searle & Co., Chicago, Ill., a corporation of Illinois No Drawing. Application May 23, 1955,
Serial No. 510,567

5 Claims. (Cl. 260—288)

The present invention relates to a new class of yohimbane derivatives, and is specifically concerned with 17-aminoyohimbane and N-substitution products thereof. The compounds of this invention in the forms of their free bases can be represented by the structural formula

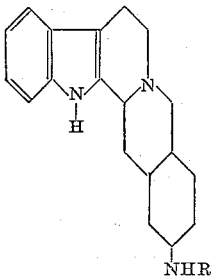

wherein R is a member of the group consisting of hydrogen and hydrocarbon radicals containing fewer than 9 carbon atoms. When R is a hydrocarbon radical in the foregoing structural formula, it can represent lower alkyl groups such as methyl, ethyl, propyl, butyl, amyl, hexyl, heptyl, octyl, and branched-chain isomers thereof. R can also represent alicyclic hydrocarbon radicals such as cyclopentyl and cyclohexyl, aromatic hydrocarbon radicals such as phenyl and tolyl, and hydrocarbon radicals of mixed type such as cyclohexylethyl and benzyl.

A suitable starting material for the manufacture of the compounds of this invention is yohimbone (17-oxoyohimbane) which can be derived by synthetic procedures well known in the art from the alkaloid yohimbine. When yohimbone is brought into contact with an organic primary amine in the presence of a hydrogen atmosphere and a hydrogenation catalyst, preferably a noble metal catalyst such as platinum oxide, according to the methods of this invention, a reductive amination occurs with the formation of an N-substituted 17-aminoyohimbane. Selection of an alkylamine, a cycloalkylamine, or an arylamine for the amination reaction leads to the production of, respectively, a 17-alkylaminoyohimbane, a 17-cycloalkylaminoyohimbane, or a 17-arylaminoyohimbane.

Amines suitable for the reductive amination of yohimbone according to the methods of this invention include aliphatic primary amines such as methylamine, ethylamine, propylamine, butylamine, amylamine, hexylamine, heptylamine, octylamine, and branched-chain isomers of the foregoing. Other amines which are suitable for use in the processes of this invention include cyclic organic primary amines such as cyclopentylamine, cyclohexylamine, cyclopentylethylamine, cyclopentylpropylamine, cyclohexylmethylamine, cyclohexylethylamine, benzylamine, aniline, and the toluidines. Ammonia, the prototype and simplest member of the class of amines, and inorganic substitution products of ammonia, such as hydroxylamine, are also operative and useful in the processes of this invention and are therefore included within the scope of the term "amines" as used herein.

The reductive amination of yohimbone with an organic primary amine proceeds satisfactorily when a solution or suspension of yohimbone and the organic primary amine in a lower aliphatic alcohol such as methanol or ethanol is shaken in contact with a hydrogen atmosphere in the presence of a noble metal catalyst such as platinum oxide. These reductive aminations proceed well at room temperature under approximately one to five atmospheres of pressure of hydrogen. As is well known in the art, a hydrogenation reaction sometimes exhibits irregular behavior in starting because of such factors as impurities in the solvents or reagents, the presence of catalyst poisons, the precise activity of a particular batch of catalyst, and other factors of this character. Accordingly, while typical reaction times under normal operating conditions have been included in many of the examples, the period of time required for completion of the reaction is more accurately determined by measuring the consumption of hydrogen rather than by conducting the reduction for an arbitrary period of time. In the reductive amination of yohimbone by a saturated organicc primary amine, there is consumed a total of approximately one molecular equivalent of hydrogen for each molecular equivalent of yohimbone and two molecular equivalents of hydrogen for each molecular equivalent of platinum oxide.

The manufacture of 17-aminoyohimbane is conveniently accomplished by the reductive amination of yohimbone using ammonia or hydroxylamine as the amine. A modification of this method for the manufacture of 17-aminoyohimbane from yohimbone comprises the steps of preparing yohimbone oxime by the reaction of yohimbone with hydroxylamine, followed by hydrogenating yohimbone oxime in methanolic or ethanolic solution in the presence of platinum oxide catalyst at room temperature and a pressure of about one atmosphere of hydrogen. Completion of this reduction reaction requires the total consumption of approximately two molecular equivalents of hydrogen for each molecular equivalent of yohimbone oxime and two molecular equivalents of hydrogen for each molecular equivalent of platinum oxide.

The organic bases described herein form salts with a variety of inorganic and strong organic acids including sulfuric, phosphoric, hydrochloric, hydrobromic, hydriodic, sulfamic, citric, lactic, maleic, malic, succinnic, tartaric, cinnamic, acetic, benzoic, gluconic, oxalic, ascorbic, and related acids. They also form quaternary ammonium salts with a variety of organic esters of sulfuric, hydrohalic, and aromatic sulfonic acids. Among such esters are methyl chloride, bromide, and iodide, ethyl chloride, propyl chloride, butyl bromide, isobutyl chloride, benzyl chloride, phenethyl chloride, naphthylmethyl chloride, dimethyl sulfate, methyl benzenesulfonate, ethyl toluenesulfonate, ethylene chlorohydrin, propylene chlorohydrin, allyl chloride, methallyl bromide, and crotyl bromide. A valuable property of the acid-addition salts is that many of them are crystalline, water-soluble materials which are particularly well-suited for the practical applications of the compounds of this invention.

The new compositions described herein have valuable physiological properties and are useful in chemotherapeutics. They are of particular value for their hypotensive properties and have the ability to lower abnormally elevated blood pressure for a relatively prolonged period of time after their administration.

This invention will appear more fully from the examples which follow. These examples are set forth by way of illustration only and it will be understood that the invention is not to be construed as limited in spirit or in scope by the details contained therein. It will be apparent to those skilled in the art that many modifications in materials and methods can be made without departing from the scope of this invention. In these examples, temperatures are given in degrees centigrade (° C.), pressures

Example 1

A solution is prepared from 3 parts of yohimbone (17-oxoyohimbane), 80 parts of methanol and 43 parts of propylamine. Platinum oxide (0.3 part) is added as a catalyst and the mixture is hydrogenated by shaking it in a hydrogen atmosphere at a temperature of about 25° C. and a pressure of about 760 mm. After about 2 hours the consumption of hydrogen ceases and the reaction is at an end. The catalyst is removed by filtration. In some instances the reaction product begins to crystallize from the mixture before the catalyst is removed and in such cases sufficient chloroform is added to the mixture to redissolve all of the organic product before the catalyst is filtered off. The filtrate is concentrated to dryness in a vacuum. Recrystallization of the residue from methanol affords 17-propylaminoyohimbane. Preparations of this compound are usually solvated and exhibit irregularities in melting point. Foaming and sintering is generally observed in the range of 85–100° C. and fusion usually occurs within the range of 130–150° C. A sample purified by distillation in a vacuum followed by recrystallization from a mixture of benzene and petroleum ether melts at about 135–137° C. without visible decomposition. This compound has the structural formula

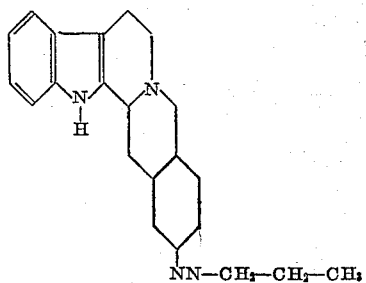

The unsolvated free base can be obtained by recrystallization from methanol followed by drying the crystallizate at 110° C. at a pressure of 0.02 mm.

The dihydrochloride of this amine is prepared by dissolving the free base in a minimum quantity of ethanol and adding a slight excess of a solution of hydrogen chloride in isopropyl alcohol. Crystallization sometimes occurs spontaneously, and a good yield of the desired product is obtained by addition of ether to the mixture. The precipitated product is purified by recrystallization from a mixture of methanol and ether to which excess hydrogen chloride has been added. 17-propylaminoyohimbane dihydrochloride does not melt or decompose at temperatures up to 330° C. It has a specific rotation of —16.8° in methanol solution.

Example 2

A solution is prepared from 2.75 parts of yohimbone, 70 parts of methanol and 40 parts of anhydrous ethylamine. Platinum oxide (0.3 part) is added as a catalyst and the mixture is hydrogenated by shaking it in contact with a hydrogen atmosphere at a temperature of about 25° C. and a pressure of about 760 mm. The reaction is almost complete within an hour after the absorption of hydrogen begins, but shaking in the hydrogen atmosphere is continued for an additional 3 hours to insure a complete reaction. At the end of this period of time the uptake of hydrogen has practically ceased. Sufficient chloroform is added to the mixture to redissolve any organic product which has crystallized from the solution and the mixture is filtered in order to remove the catalyst. When the filtrate is concentrated to dryness a crude crystalline product results. Recrystallization of this crude product from various solvents affords 17-ethylaminoyohimbane, often in a solvated form. This compound has the structural formula

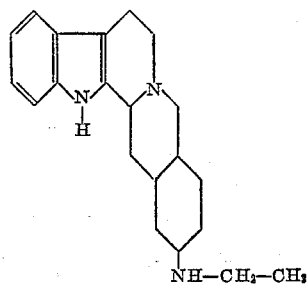

The observed melting point is dependent on the crystallization solvent and the degree of solvation. When the compound is recrystallized from aqueous methanol, there is typically observed sintering beginning at about 125° C. and complete fusion over a range extending to about 179–180° C. Recrystallization from acetone affords a product which softens from about 140° C., reverts to a crystalline form at about 160° C., and melts with decomposition at 182–184° C. Recrystallization from benzene yields an anhydrous preparation melting with decomposition at 181.5–182.5° C.

Treatment of a solution of the free base in a minimum amount of ethanol with an excess of picric acid in ethanol affords a picrate which crystallizes from aqueous ethanol as orange-yellow needles.

When a solution of 17-ethylaminoyohimbane in ethanol is treated by the addition of an excess of oxalic acid in ethanol, a salt precipitates. For purification it is dissolved in a small amount of water, and the solution is filtered and diluted with ethanol and ether. The precipitated product, which consists principally of the salt formed by the reaction of one molecule of 17-ethylaminoyohimbane with two molecules of oxalic acid, is collected on a filter. In an evacuated capillary tube this compound melts at about 230–232° C.

Example 3

A mixture of 2.75 parts of yohimbone, 70 parts of methanol, 40 parts of isopropylamine, and 0.3 part of platinum oxide is hydrogenated by shaking it in contact with a hydrogen atmosphere for 1 hour at a temperature of about 25° C. and a pressure of about 760 mm. At the beginning of the hydrogenation period, not all of the yohimbone is in solution, but it gradually dissolves as hydrogenation proceeds. The reaction mixture is then filtered from the catalyst and the filtrate is concentrated to dryness. Purification by recrystallization of the residue from aqueous ethanol affords 17-(isopropylamino)yohimbane having the structural formula

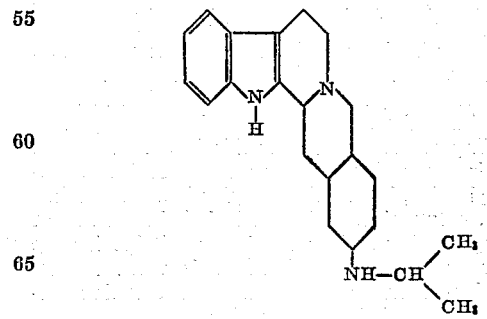

This preparation is solvated and exhibits irregularities in its melting point. Typically it sinters at about 118° C. and melts in the range of 127–142° C.

A crystalline, water-soluble salt of this free base is obtained by dissolving 1 part of 17-(isopropylamino)yohimbane in 10 parts of warm 10% aqueous sulfuric acid, and adding acetone until crystallization begins. The white, crystalline salt is collected on a filter and can be further purified by recrystallization from aqueous acetone. This preparation undergoes extensive decomposition between 250 and 300° C. but does not melt at temperatures up to 320° C.

Example 4

A solution is prepared from 2.5 parts of yohimbone, 80 parts of methanol and 45 parts of butylamine. Platinum oxide (0.3 part) is added as a catalyst, and the mixture is hydrogenated by shaking it in a hydrogen atmosphere at a temperature of about 25° C. and a pressure of about 760 mm. for 2 hours. The reaction mixture is then filtered from the catalyst and the filtrate is concentrated to dryness. The residue is purified by recrystallization from aqueous methanol to yield 17-butylaminoyohimbane having the following structural formula

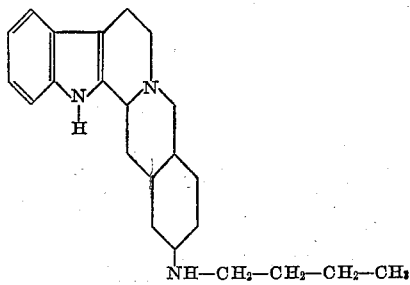

NH—CH$_2$—CH$_2$—CH$_2$—CH$_3$

This preparation is solvated and gives a clear melt with loss of solvent at about 100 C.

Treatment of 17-butylaminoyohimbane in isopropyl alcohol solution by the addition of one equivalent of sulfuric acid in ethanol causes the precipitation of a salt.

This salt is purified by dissolving it in a minimum quantity of water and reprecipitating it by the addition of acetone. In this manner it is obtained as a white powder which melts and decomposes in an evacuated capillary tube at about 265–266° C. after previous sintering.

Example 5

A mixture is prepared from 2.5 parts of yohimbone, 70 parts of methanol and 10 parts of anhydrous methylamine. Platinum oxide (0.3 part) is added as a catalyst and the mixture is hydrogenated by shaking it in contact with a hydrogen atmosphere at a temperature of about 25° C. and a pressure of about 760 mm. When the uptake of hydrogen has practically ceased after a period of several hours, sufficient chloroform is added to the mixture to redissolve any organic product which has crystallized from the solution, and the mixture is filtered in order to remove the catalyst. The residue is purified by recrystallization from aqueous methanol to yield 17-methylaminoyohimbane having the following structural formula

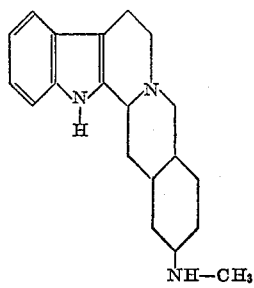

NH—CH$_3$

This compound gives a water-soluble salt with hydrochloric acid.

Example 6

A mixture of 5 parts of yohimbone, 50 parts of pyridine and 40 parts of ethanol is heated to the temperature of reflux and treated by the addition of 5 parts of hydroxylamine hydrochloride. A crystalline precipitate begins to form almost immediately. The mixture is heated under reflux for 2 hours and is then cooled and diluted with ether. The reaction product is collected on a filter and washed with ether. It is then stirred with 320 parts of refluxing methanol, and sufficient water is added to give a clear solution. A small amount of insoluble residue is removed by filtration, and ice and water are added until the quantity of filtrate amounts to about 1800 parts. The free base, yohimbone oxime, is precipitated by the addition of dilute sodium bicarbonate solution, and after crystallization is complete the precipitate is collected on a filter and washed with water. This product has the structural formula.

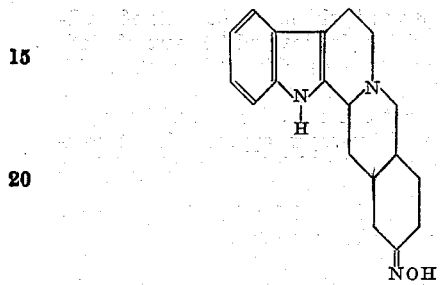

NOH

The monohydrochloride is obtained by dissolving the free base in a small amount of ethanol, adding an equal volume of ether, filtering from a trace amount of insoluble material, adding a solution of hydrogen chloride in isopropyl alcohol and diluting the mixture with an excess of ether. The product is collected on a filter and washed with ether. It is recrystallized by dissolving it in hot methanol containing a small amount of water and adding ether to the solution. This product begins to darken at about 260° C. and undergoes gross decomposition at 312–314° C.

Example 7

A solution of 5 parts of yohimbone oxime in 160 parts of ethanol is treated by the addition of 1 part of platinum oxide catalyst and hydrogenated by shaking it in a hydrogen atmosphere at a temperature of about 25° C. and a pressure of about 760 mm. The first molecular equivalent of hydrogen is taken up fairly rapidly, but the reduction then becomes slower and several hours are required for the completion of the reaction. The completion of the reaction is indicated when the total consumption of hydrogen is approximately equal to two molecular equivalents of hydrogen for each molecular equivalent of yohimbone oxime and two molecular equivalents of hydrogen for each molecular equivalent of platinum oxide. The reaction mixture is then filtered from the catalyst and the filtrate is concentrated to dryness. The residue is dissolved in acetone and the solution is decolorized with activated carbon. It is then filtered and the filtrate is concentrated to about 160 parts and diluted with about 130 parts of petroleum ether. When this mixture is refrigerated and allowed to stand, a crystallizate of 17-aminoyohimbane separates. The product is collected on a filter and washed with petroleum ether. It has the structural formula

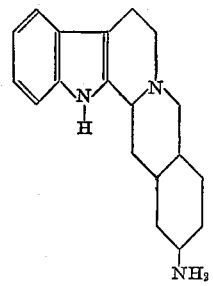

NH$_2$

The compound can be obtained in a higher state of purity by further recrystallization from acetone. This preparation is solvated. When it is heated gradually in a capillary tube from room temperature, it undergoes a change in crystalline form and finally melts with decomposition at about 256–260° C. When a sample in a capillary tube is immersed in a bath preheated to 170° C., there is observed instantaneous melting followed by resolidification and final fusion at 256–260° C.

17-aminoyohimbane dissolves in aqueous hydrochloric acid, with which reagent it forms a salt. The free base can be reprecipitated from the acidic solution by the addition of potassium hydroxide.

*Example 8*

A mixture of 2.2 parts of yohimbone, 80 parts of methanol, 8.6 parts of cyclohexylamine and 0.3 part of platinum oxide is hydrogenated by shaking it in contact with a hydrogen atmosphere at a temperature of about 25° C. and a pressure of about 760 mm. for several hours, or until the absorption of hydrogen appears almost complete. Any reaction product which has crystallized from the mixture is redissolved by the addition of chloroform, and the catalyst is then removed by filtration. The filtrate is distilled at a bath temperature of about 100° C. in order to remove the methanol and chloroform, and is then concentrated in a vacuum until most of the cyclohexylamine is removed. The residue is crystallized by the addition of aqueous methanol and the solid product is collected on a filter and washed with aqueous methanol. This compound is 17-cyclohexylaminoyohimbane having the following structural formula

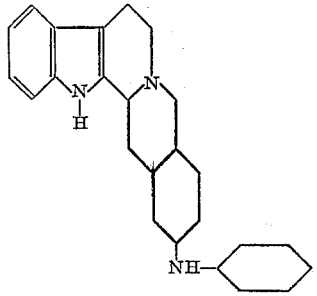

This compound gives a water-soluble salt with hydrochloric acid.

*Example 9*

By the procedure of Example 8, with the substitution of 10 parts of benzylamine for the cyclohexylamine, there is obtained 17-benzylaminoyohimbane.

*Example 10*

By the procedure of Example 8, with the substitution of 10 parts of aniline for the cyclohexylamine, there is obtained 17-phenylaminoyohimbane.

What is claimed is:

1. A member of the group consisting of bases and non-toxic salts thereof, said bases having the structural formula

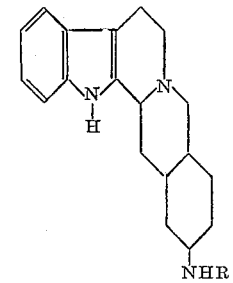

wherein R is a member of the group consisting of hydrogen and hydrocarbon radicals containing fewer than 9 carbon atoms.

2. 17-aminoyohimbane.
3. A compound having the structural formula

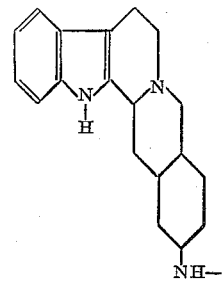

4. 17-methylaminoyohimbane.
5. 17-ethylaminoyohimbane.

References Cited in the file of this patent

Chimie and Industrie (Majiman et al.) v. 35, p. 372 (272(d)).

Organic Reactions, Adams et al., v. IV, pp. 174–202, N. Y.